(12) United States Patent
Min

(10) Patent No.: US 11,837,251 B2
(45) Date of Patent: Dec. 5, 2023

(54) VIRTUAL COUNSELING SYSTEM AND COUNSELING METHOD USING THE SAME

(71) Applicant: SOLUGATE INC., Seoul (KR)

(72) Inventor: Sung Tae Min, Seoul (KR)

(73) Assignee: SOLUGATE INC., Seoul (KR)

( * ) Notice: Subject to any disclaimer, the term of this patent is extended or adjusted under 35 U.S.C. 154(b) by 358 days.

(21) Appl. No.: 17/212,890

(22) Filed: Mar. 25, 2021

(65) Prior Publication Data

US 2021/0249036 A1    Aug. 12, 2021

Related U.S. Application Data

(63) Continuation of application No. PCT/KR2019/011796, filed on Sep. 11, 2019.

(30) Foreign Application Priority Data

Sep. 28, 2018 (KR) .................. 10-2018-0115490

(51) Int. Cl.
*G10L 25/63* (2013.01)
*G06F 16/65* (2019.01)
*G10L 15/06* (2013.01)
*G10L 15/08* (2006.01)
(Continued)

(52) U.S. Cl.
CPC .............. *G10L 25/63* (2013.01); *G06F 16/65* (2019.01); *G10L 15/063* (2013.01);
(Continued)

(58) Field of Classification Search
CPC ..... G10L 25/63; G10L 15/063; G10L 15/083; G10L 15/1822; G10L 15/26; G06F 16/65
(Continued)

(56) References Cited

U.S. PATENT DOCUMENTS 9,197,736 B2 * 11/2015 Davis .................. G06F 3/04847
10,681,311 B1 * 6/2020 Gottman ................ G06Q 50/22
(Continued)

FOREIGN PATENT DOCUMENTS

JP         2018-073343 A      5/2018
KR    10-2008-0112771 A    12/2008
(Continued)

OTHER PUBLICATIONS

International Search Report issued in PCT/KR2019/011796; dated Mar. 3, 2020.
(Continued)

*Primary Examiner* — Susan I McFadden
(74) *Attorney, Agent, or Firm* — Studebaker & Brackett PC

(57) ABSTRACT

The present disclosure relates to a virtual counseling system in which a user can virtually receive counseling by inputting query information into a system. A virtual counseling system according to an embodiment of the present disclosure may include an input unit obtaining audio information from a user and generating audio data; a determination unit receiving the audio data through the input unit, determining a type of the audio data, and generating type information on the audio data; and a text data generation unit generating object data by receiving the type information from the determination unit, converting content of the audio data into first text data, and combining the object data and the first text data to generate second text data.

11 Claims, 3 Drawing Sheets

(51) Int. Cl.
*G10L 15/18* (2013.01)
*G10L 15/26* (2006.01)

(52) U.S. Cl.
CPC ........ *G10L 15/083* (2013.01); *G10L 15/1822* (2013.01); *G10L 15/26* (2013.01)

(58) Field of Classification Search
USPC ........................................................ 704/270
See application file for complete search history.

(56) References Cited

U.S. PATENT DOCUMENTS

| | | | |
|---|---|---|---|
| 10,785,365 B2 * | 9/2020 | Rodriguez | H04M 1/72469 |
| 10,957,083 B2 * | 3/2021 | Du | G06F 3/015 |
| 11,417,330 B2 * | 8/2022 | Reece | G06F 18/25 |
| 11,488,595 B2 * | 11/2022 | Min | G06N 3/006 |

FOREIGN PATENT DOCUMENTS

| | | |
|---|---|---|
| KR | 10-2012-0117041 A | 10/2012 |
| KR | 10-2014-0060187 A | 5/2014 |
| KR | 10-2015-0141279 A | 12/2015 |
| KR | 10-2016-0060243 A | 5/2016 |
| KR | 10-2016-0114668 A | 10/2016 |
| KR | 10-2016-0138613 A | 12/2016 |
| KR | 10-1827320 B1 | 2/2018 |

OTHER PUBLICATIONS

Office Action issued in KR 10-2018-0115490; mailed by the Korean Intellectual Property Office dated Mar. 16, 2020.

* cited by examiner

VIRTUAL COUNSELING SYSTEM AND COUNSELING METHOD USING THE SAME

CROSS-REFERENCE TO RELATED APPLICATION

The present application is a continuation of International Patent Application No. PCT/KR2019/011796, filed on Sep. 11, 2019, which is based upon and claims the benefit of priority to Korean Patent Application No. 10-2018-0115490 filed on Sep. 28, 2018. The disclosures of the above-listed applications are hereby incorporated by reference herein in their entirety.

BACKGROUND

1. Technical Field

The present disclosure relates to a virtual counseling system in which a user can virtually receive counseling by inputting queries to a system, and a counseling method using the same.

2. Description of Related Art

A call center originally meant a center where a company simply received inquiry calls from customers. However, in recent years, call centers have come to perform a function of creating newly added value while responding to various requests from customers for information provision related to products and delivery, corporate image enhancement, marketing, and customer service.

The service of the above-described call center is generally provided through a telephone. The method of providing service using such a telephone is to receive inquiries and problems of the company, products, delivery, customer service, and other information through a counselor when a customer makes a phone call, and then respond with corresponding information or measures.

The method of providing a call center service using such a telephone has a drawback in that a counselor has to always maintain a presence.

Accordingly, there may be a drawback in that the call center service may not be available after the counselor leaves the office. In addition, when the counselor works overtime, there may be a drawback in that costs such as labor costs may increase.

Accordingly, in recent years, an Automatic Response System (ARS) has been introduced, wherein data, stored as text, is converted into audio and provided, or various pieces of information are stored as audio, and when a customer accesses the system using a telephone, the system informs the customer of a method of use so that necessary information can be retrieved by audio, and when the necessary information is found, the information is heard as audio.

However, the above-described ARS informs a customer of an information retrieval method, and then outputs the necessary information upon the input, which may require a significant amount of time for the customer to be familiar with the above-described information retrieval method. In addition, because the ARS is not a conversation-based processing system, the information retrieval method may be very inconvenient to use.

Accordingly, even with the conventional ARS described above, there is a drawback in that it is difficult to accurately and quickly obtain the information desired by the customer.

SUMMARY

The present disclosure is directed to addressing an issue associated with the related art, and to providing accurate reply data to a question input by a user and analyzing a user's emotions so that more detailed counseling can be made.

In this regard, an aspect of the present disclosure is to provide a virtual counseling system and a counseling method using the same, which can accurately grasp a user's intention in asking questions and emotions, and smoothly proceed with counseling based thereon.

Other aspects and advantages of the present disclosure will become more apparent by reference to the following detailed description of the invention, claims, and drawings.

A virtual counseling system according to an embodiment of the present disclosure may include an input unit obtaining audio information from a user and generating audio data; a determination unit receiving the audio data through the input unit, determining a type of the audio data, and generating type information on the audio data; and a text data generation unit generating object data by receiving the type information from the determination unit, converting content of the audio data into first text data, and combining the object data and the first text data to generate second text data.

A virtual counseling method according to another embodiment of the present disclosure may include obtaining audio data from a user; receiving the audio data, determining a type of the audio data, and generating type information on the audio data; generating object data by receiving the type information, converting content of the audio data into first text data, and combining the object data and the first text data to generate second text data; and generating feedback data based on the second text data and providing the feedback data to the user.

According to an aspect of the present disclosure, there is provided a virtual counseling system and a counseling method using the same, which can accurately grasp the user's emotional state and intention in asking questions and, and proceed with smooth counseling based thereon.

DETAILED DESCRIPTION

Figure 1:
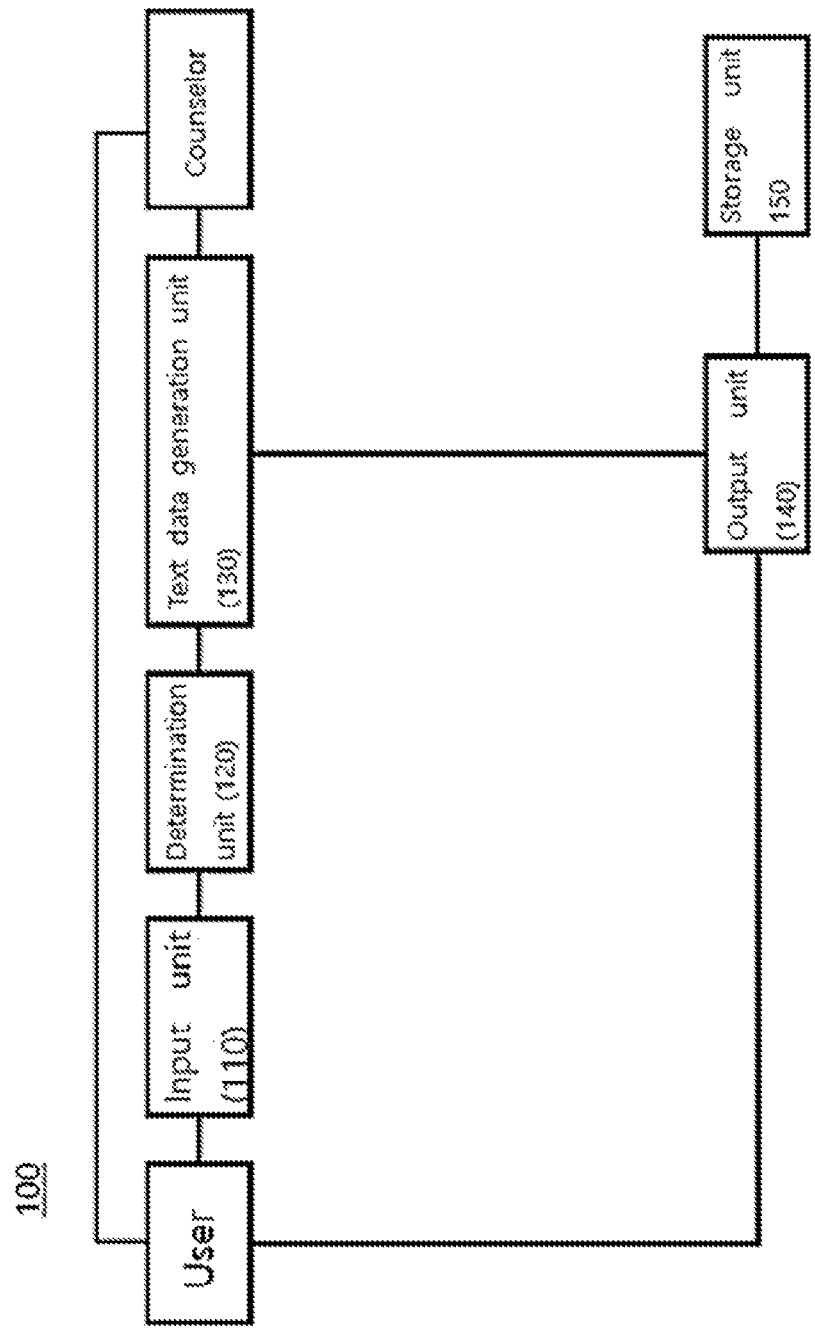
FIG. 1 illustrates the overall configuration of a virtual counseling system according to an embodiment of the present disclosure.

Advantages, features, and methods of accomplishing the same of the present disclosure will become apparent with reference to embodiments described in detail below together with the accompanying drawings. However, the present disclosure is not limited by embodiments disclosed hereinafter, and may be implemented in various forms. Rather, these embodiments are provided to so that this disclosure will be through and complete and will fully convey the scope of the present disclosure to those skilled in the technical field to which the present disclosure pertains, and the present disclosure will only be defined by the appended claims. Hereinafter, specific embodiments for carrying out the present disclosure will be described in detail with reference to the accompanying drawings. Regardless of the drawings, like reference numerals designate like elements, and the term "and/or" includes each and all combinations of one or more of the associated listed items.

Terms used in the specification are used to describe embodiments of the present disclosure and are not intended to limit the scope of the present disclosure. In the specification, the terms of a singular form may include plural forms unless otherwise specified. The expressions "comprise" and/or "comprising" used herein do not preclude the presence or addition of one or more other elements other than stated elements.

Unless otherwise defined, all terms (including technical and scientific terms) used herein have the same meaning as commonly understood by those skilled in the technical field to which the present disclosure pertains. It will be further understood that terms, such as those defined in commonly used dictionaries, should not be interpreted in an idealized or overly formal sense unless expressly herein.

Hereinafter, a virtual counseling system and a counseling method using the same according to an embodiment of the present disclosure will be described.

Figure 2:
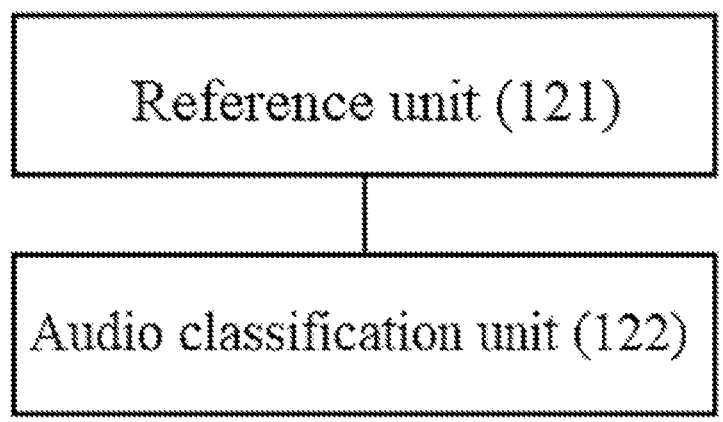
FIG. 2 illustrates a determination unit of a virtual counseling system according to an embodiment of the present disclosure.
Figure 3:
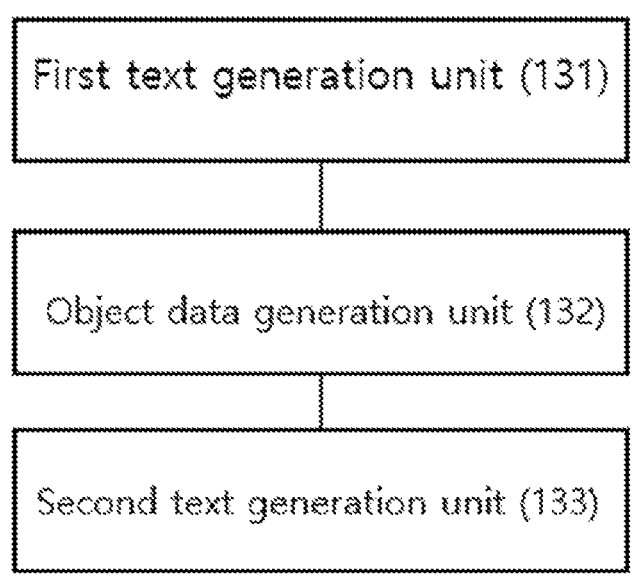
FIG. 3 illustrates a text data generation unit of a virtual counseling system according to an embodiment of the present disclosure.

FIG. 1 illustrates the overall configuration of a virtual counseling system according to an embodiment of the present disclosure. FIG. 2 illustrates a determination unit of the virtual counseling system. FIG. 3 illustrates a text data generation unit of the virtual counseling system.

Referring to FIGS. 1 to 3, the virtual counseling system 100 according to an embodiment of the present disclosure may include an input unit 110, a determination unit 120, a text data generation unit 130, an output unit 140, and a storage unit 150.

The input unit 110 obtains audio information of a user and generates audio data. Various input devices may be included to receive data from the user.

In other words, the input unit 110 recognizes audio of a user and generates audio data. In this case, a device of removing frequencies other than the human audio frequency or an internal processing step may be additionally provided, thereby improving an audio recognition rate.

In addition, the input unit 110 may amplify the volume of the audio information in order to improve reliability of the user's audio data. Through this, the recognition rate of the user's audio information can be improved.

Next, the determination unit 120 is connected to the input unit 110 and receives audio data generated by the input unit 110 to discriminate characteristics of the audio data.

In other words, the determination unit 120 receives the audio data through the input unit 110, determines a type of the audio data, and generates type information on the audio data.

To this end, the determination unit 120 may include a reference unit 121 including reference information for determining the type of the audio data, and an audio classification unit 122 determining the type of the audio data and generating the type information.

Here, the type information may include first type information including user's emotion information and second type information including sentence-type information of audio data. The sentence-type information may be information on whether the audio data generated from the user's audio information is an interrogative sentence, a plain sentence, a question, a request, or a claim.

The reference unit 121 may include learning data serving as reference information for determining to which type the audio data belong. Here, the learning data may include emotional word data for determining a user's emotion and sentence-type data for determining a sentence type of the audio data. In other words, the reference unit 121 may include emotional word data, which is reference data for determining a user's emotion from the user's audio data.

In addition, the reference unit 121 may include sentence-type data, which is reference data for determining a sentence type through the content, sound, and tone of the sentence intended by the user from the user's audio data.

In addition, the reference unit 121 may also include audio-type data for directly determining a human audio in addition to the data listed above. Through this, the virtual counseling system according to an embodiment of the present disclosure may ultimately enable machine learning through human produced audio.

As the counseling is repeated and the audio data of users is accumulated, the contents of the learning data of the reference unit 121 are updated. In other words, the contents of the learning data are enriched. As a whole, information of the emotional word data and the sentence-type data is updated through counseling, so that the degree of completion of counseling in the virtual counseling system according to an embodiment of the present disclosure may be improved. This learning may be carried out by a machine learning method, which is an algorithm of artificial intelligence (AI).

More specifically, as described above, when the learning data of the reference unit 121 is updated, the audio classification unit 122 to be described later may more accurately classify the user's audio through learning based on machine learning based on the updated data. In other words, based on the updated data of the reference unit 121, the audio classification unit 122 may expand the audio classification function through learning.

The reference unit 121 may include a storage device to store learning data.

The audio classification unit 122 compares the audio data and the learning data of the reference unit 121 with each other, and generates type information thereby. Alternatively, the audio classification unit 122 may generate type information through a system that has been learned based on the audio data.

In other words, the audio classification unit 122 compares the user's tone and sound included in the audio data, and the emotional word data of the learning data with each other to determine the user's emotional state.

In addition, the audio classification unit 122 compares the user's tone and speech content (request for explanation, question, request, claim, etc.) included in the audio data and the sentence-type data of the learning data with each other to determine the sentence type of the user.

Alternatively, as described above, through the data included in the reference unit 121 or updated data, the audio classification unit 122 enables learning for directly classifying the audio data, and thereby, the audio classification unit 122 may perform direct learning, not dependent on data stored in the reference unit 121, and may classify the user's audio data by type.

In other words, the data of the reference unit 121 may be used as materials that the audio classification unit 122 may perform learning by machine learning, and may not be used as materials that are directly compared with the user's audio data.

Through this process, the audio classification unit 122 finally generates type information. As described above, the type information may include first type information including user's emotion information and second type information including sentence-type information of the audio data. Alternatively, the type information may include only any one of the first type information and the second type information.

The audio classification unit 122 of the determination unit 120 may include a control device or a signal processing device to compare the audio data and the learning data, and thereby generate type information. Alternatively, the audio classification unit 122 may generate type information from audio data based on information and logic acquired through learning. In other words, based on the information acquired by machine learning, the audio classification unit 122 may generate type information from audio data.

Next, the text data generation unit 130 generates object data by receiving the type information from the determination unit 120, converts content of the audio data into first text data, and combines the object data and the first text data to generate second text data.

The second text data generated by the text data generation unit 130 is the best method. However, in some cases, the text data generation unit 130 may not convert the audio data into the first text data, but may directly combine the object data and the audio data to form fusion data and generate the second text data from the fusion data.

To this end, the text data generation unit 130 may include a first text generation unit 131 generating the first text data, an object data generation unit 132 generating the object data, and a second text generation unit 133 generating the second text data.

The first text generation unit 131 textualizes the user's speech content included in audio data. To this end, the first text generation unit 131 may include audio text information in which audio and text are matched with each other. In other words, the first text generation unit 131 compares and analyzes the user's audio data and audio text information with each other to generate first text data.

When the first text generation unit 131 is implemented based on machine learning, the first text generation unit 131 generates the first text data based on the audio data by the learned logic without comparing and analyzing the audio data and the audio text information.

The object data generation unit 132 generates object data based on the type information transmitted from the determination unit 120. The object data includes the user's emotion information and information on whether the content of the user's audio data is an interrogative sentence or a plain sentence.

More specifically, the object data generation unit 132 generates user's emotional information (anger, surprise, question, happiness, thanks, urgency, etc.) based on the first type information among the type information. In addition, the object data generation unit 132 generates information on whether the sentence type is an interrogative sentence or a plain sentence based on the second type information among the type information. The information generated in this way is included in the object data.

The second text generation unit 133 combines the first text data and the object data to finally generate second text data. The first text data include only the content of speech, but does not expressly include the user's emotions or intentions. Accordingly, the user's emotion and sentence form (intention), which are object data, are combined with the first text data to generate second text data, so that the user's accurate counseling intention can be grasped.

Emotion information may be displayed in the form of an emoticon in the first text data, or a question mark may be included in the first text data. In this way, the object data is displayed in the first text data in various forms.

The output unit 140 generates feedback data including an answer corresponding to the user's counseling intention based on the second text data. The output unit 140 provides the generated feedback data to the user. The user may check the feedback data to determine whether the content of his/her counseling has been correctly performed. If the user does not receive satisfactory counseling, the user may receive additional counseling by additionally inputting audio information through the input unit 110.

When the user is in an extreme emotional state, virtual counseling may not proceed smoothly. When the determination unit 120 analyzes the user's audio data and determines that it is difficult for the user to proceed with a normal counseling (for example, when audio volume included in the audio data is more than a preset decibel (dB)), the virtual counseling may be stopped, and counseling with an actual counselor may proceed.

The above-described second text data may be transmitted to a counselor, and the counselor may grasp the counseling intention and emotional state of the user before the counseling is started based thereon. As a result, the counselor may proceed with preliminary work for smoother counseling, and the user may receive satisfactory counseling.

The information output from the output unit 140 may be stored in the storage unit 150. When the information is stored in the storage unit 150, it is stored by a block chain, so that counseling contents may be stored in a time series. The storage unit 150 may store information such as contents of a user's counseling, a user's tone during counseling, a habit, a counseling date and time, and weather. In addition, the storage unit 150 may store the user's counseling content, that is, the user's audio.

When a user later uses the virtual counseling system 100 of the present disclosure, a smoother counseling may be performed by referring to the user's previous counseling contents based on the stored information.

Figure 4:
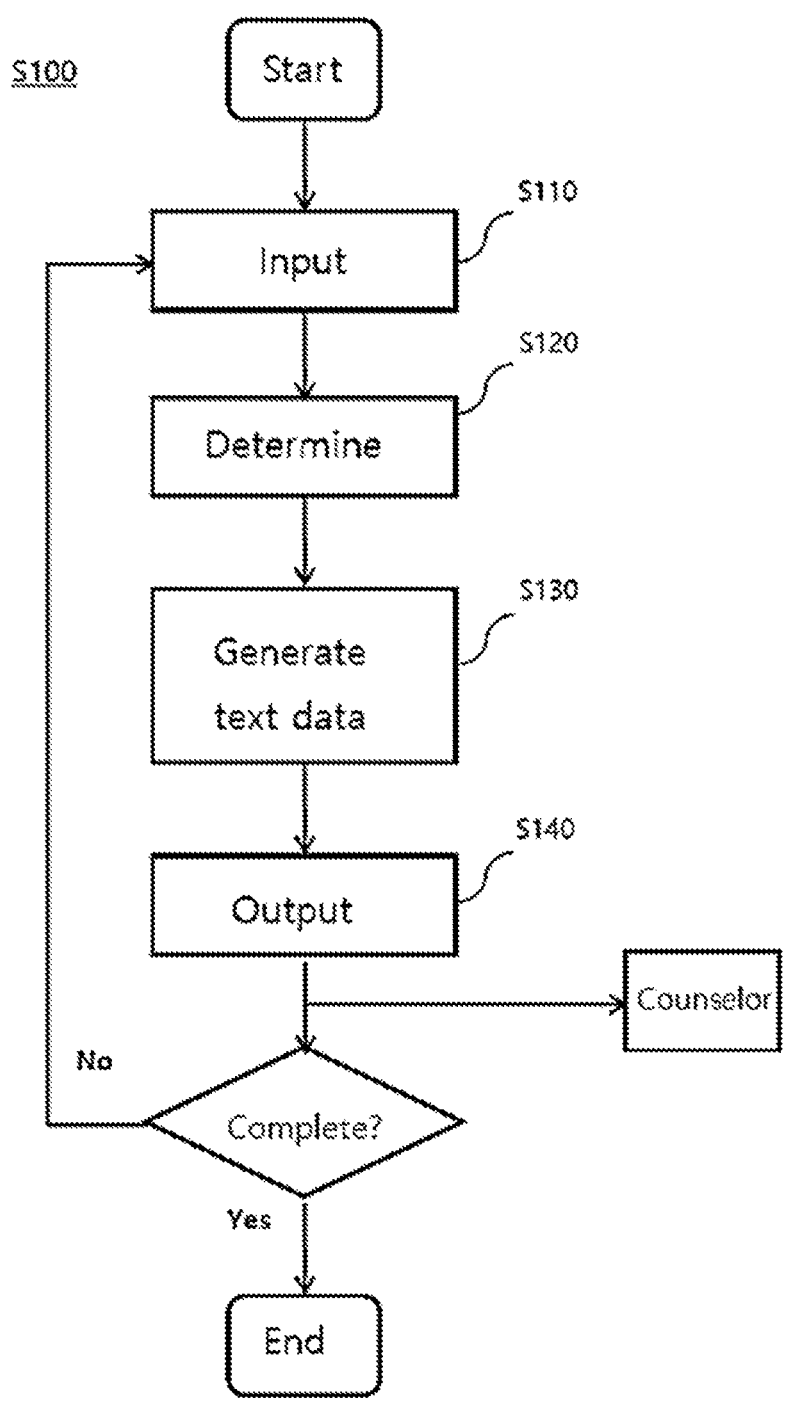
FIG. 4 is a flowchart of a virtual counseling method using a virtual counseling system according to an embodiment of the present disclosure.

Next, a virtual counseling method using the virtual counseling system 100 according to an embodiment of the present disclosure will be described in detail. FIG. 4 is a flowchart of a virtual counseling method using a virtual counseling system according to an embodiment of the present disclosure.

As illustrated in FIG. 4, the virtual counseling method S100 using the virtual counseling system according to an embodiment of the present disclosure includes an input operation S110, a determination operation S120, a text data generation operation S130, and an output operation S140.

In the input operation S110, audio data is obtained from a user. In other words, the user inputs audio information and converts the audio information into an electric signal to obtain audio data. In this operation, in order to improve the degree of extraction of audio data, it may be possible to amplify the user's audio information.

Subsequently, in the determination operation S120, the audio data is received, the type of the audio data is determined, and type information on the audio data is generated.

The type information is generated by the above-described determination unit (120 in FIG. 1), wherein the determination unit 120 may include a reference unit (121 in FIG. 2) including reference information for determining the type of the audio data, and an audio classification unit (122 in FIG. 2) determining the type of the audio data and generating the type information.

Here, the type information may include first type information including user's emotion information and second type information including sentence-type information of the audio data.

The reference unit 121 may include learning data serving as reference information. Here, the learning data may include emotional word data for determining a user's emotion and sentence-type data for determining a sentence type of the audio data. The information of the emotional word data and the sentence-type data may be updated through repeated counseling. In addition, the learning data may include the user's audio. Accordingly, the audio classification unit 122 may perform learning through the learning data of the reference unit 121. In other words, the audio classification unit 122 may determine the contents of the user's counseling from the user's audio data from the learning data by machine learning.

In the text data generation operation S130, the object data is generated by receiving the above-described type information, the content of the audio data is converted into first text data, and the object data and the first text data are combined to generate second text data. Here, the object data may include the user's emotion information and information on whether a content of the user's audio data is an interrogative sentence or a plain sentence.

In the output operation S140, feedback data is generated based on the above-described second text data, and the feedback data is provided to the user, so that the user may receive a reply to the inquired counseling content.

For reference, if the feedback data generated based on the second text data is provided to the user, but the user does not receive satisfactory counseling, the user may additionally input audio information through the input unit and receive additional counseling.

Through the input of additional audio information, the amount of information of the above-described learning data increases, and the amount of learning of the audio classification unit 122 is increased by the increased amount of information. Accordingly, the audio classification unit 122 would have the ability to more accurately determine the type of the user's audio data.

When it is determined that it is difficult to proceed with a virtual counseling with a user, the second text data is transmitted to a counselor, and the counselor may consult with the user based on the second text data.

Specifically, individual weights may be applied to each sentence, word, context, emotion, etc. based on the first text data or object data included in the second text data generated during the virtual counseling with the user. It may be possible to calculate numerically how close to the threshold for situations in which a response is needed.

In addition to virtual counseling in advance, a complaint index may be provided to evaluate whether a professional counselor should conduct counseling over a direct phone call. The complaint index establishes a separate database for each sentence and word in advance. When a corresponding sentence or word appears directly or a similar word appears, a complaint index, which is the sum of the sub-complaint indexes, may be determined by assigning a predetermined weight to the corresponding sub-complaint index.

A high weight may be applied to words or sentences that directly indicate customer complaints. If the value of the complaint index, which is the sum of each sub-complaint index, exceeds a predetermined threshold while virtual counseling continues, the complaint counselor who is currently available and has the highest matching rate among the responders in the complaint response team database stored or managed in advance is matched. The corresponding complaint counselor may accurately recognize the previous virtual counseling situation based on the transmitted second text data, and may continuously respond. In this process, the matching rate of the complaint counselor may be calculated according to the type of the second text data classified according to a predetermined criterion in addition to the sum of the complaint indexes. To this end, the second text data may be assigned a type according to a predetermined classification. The matching rate of the complaint counselor may be determined in further consideration of whether the counselor has an experience in responding to similar complaint situations in the past, and may be determined based on the similarity with the type of the second text data described above. To this end, it may be possible to collect and manage counseling history data for each complaint counselor, and by analyzing the personality and behavior type of each complaint counselor in advance, it may be possible to determine the complaint counselor who better matches the situation, the intensity of the complaint, the topic of the complaint, and the reason for the complaint.

From the foregoing, although the embodiments of the present disclosure have been described. It should be noted, however, that the present disclosure is not limited to the above embodiments, and may be implemented in various forms. Those skilled in the technical field to which the present disclosure pertains will understand that the present disclosure may be practiced in other detailed forms without departing from the technical spirit or essential features of the present disclosure. Therefore, it should be understood that the above-described embodiments are exemplary in all aspects rather than being restrictive.

The invention claimed is:

1. A virtual counseling system, comprising:
a microphone configured to receive a voice of a user, amplify a volume of the voice, remove frequencies other than a human audio frequency, and convert the voice into audio data;
a processor configured to:
receive the audio data from the microphone;
determine an emotion corresponding to the audio data, and identify whether a content of the audio data is an interrogative sentence or a plain sentence;
generate type information of the audio data, wherein the type information includes first type information indicating the user's emotion information in a form of an emoticon and second type information including sentence-type information indicating whether the content of the audio data is the interrogative sentence or the plain sentence in a form of punctuation mark;
convert the content of the audio data into first text data;
combine the type information and the first text data to generate second text data;
determine, based on the second text data, suitability of a virtual counseling for the user;
when it is determined that the virtual counseling is suitable for the user, proceed with the virtual counseling for the user; and
when it is determined that the virtual counseling is not suitable for the user, stop the virtual counseling for the user, transmit the second text data to a device of a human counselor, and connect a device of the user with the device of the human counselor via a network,
wherein the human counselor is selected from a plurality of human counselors based on a matching rate that is calculated from a complaint index of the audio data and a counseling history of a respective human counselor.

2. The virtual counseling system of claim 1, wherein the processor comprises a reference database storing reference information for determining a type of the audio data and generating the type information.

3. The virtual counseling system of claim 2, wherein the reference database further stores learning data serving as the reference information.

4. The virtual counseling system of claim 3, wherein the learning data comprises emotional word data for determining the user's emotion and sentence-type data for determining a sentence type of the audio data.

5. The virtual counseling system of claim 4, wherein information of the emotional word data and the sentence-type data is updated through repeated counseling.

6. The virtual counseling system of claim 1, further comprising:
receiving feedback data from the user who received the second text data; and
when the feedback data indicates that the user does not receive satisfactory counseling, receiving additional audio information from the user, through the microphone.

7. A virtual counseling method performed by a system, the method comprising:
performing, by a microphone:
receiving a voice of a user;
amplifying a volume of the voice;
removing frequencies other than a human audio frequency; and
converting the received voice into audio data;
performing, by a processor:
receiving the audio data from the microphone;
determining an emotion corresponding to the audio data, and identifying whether a content of the audio data is an interrogative sentence or a plain sentence;
generating type information of audio data, wherein the type information includes first type information indicating the user's emotion information in a form of an emoticon and second type information including sentence-type information indicating whether the content of the audio data is the interrogative sentence or the plain sentence in a form of punctuation mark;
converting the content of the audio data into first text data;
combining the type information and the first text data to generate second text data;
determining, based on the second text data, suitability of a virtual counseling for the user;
when it is determined that the virtual counseling is suitable for the user, proceeding with the virtual counseling for the user; and
when it is determined that the virtual counseling is not suitable for the user, stopping the virtual counseling for the user, transmitting the second text data to a device of a human counselor, and connecting a device of the user with the device of the human counselor via a network,
wherein the human counselor is selected from a plurality of human counselors based on a matching rate that is calculated from a complaint index of the audio data and a counseling history of a respective human counselor.

8. The method of claim 7, further comprising:
storing, in a reference database, reference information for determining a type of the audio data and generating the type information.

9. The method of claim 8, further comprising:
storing, in the reference database, learning data serving as the reference information.

10. The method of claim 9, wherein the learning data comprises emotional word data for determining the user's emotion and sentence-type data for determining a sentence type of the audio data.

11. The method of claim 10, wherein information of the emotional word data and the sentence-type data is updated through repeated counseling.

* * * * *